United States Patent [19]
Yale

[11] 3,929,787
[45] Dec. 30, 1975

[54] 6,7,8,9-TETRAHYDRO-PYRIDO(1,2-A)PYRIMIDIN-4-ONES

[75] Inventor: Harry Louis Yale, New Brunswick, N.J.

[73] Assignee: E. R. Squibb & Sons, Inc., Princeton, N.J.

[22] Filed: Apr. 22, 1974

[21] Appl. No.: 462,899

[52] U.S. Cl.......... 260/251 A; 260/482 R; 260/483; 424/251
[51] Int. Cl.².................................. C07D 471/04
[58] Field of Search................................ 260/251 A

[56] References Cited
UNITED STATES PATENTS
3,585,198    6/1971    Meszaros et al.............. 260/251

FOREIGN PATENTS OR APPLICATIONS
4,911    8/1972    Hungary

OTHER PUBLICATIONS

Adams et al., J. Am. Chem. Soc., Vol. 74, 5491–5497 (1952).

Mendel, Chemical Abstracts, Vol. 77, 126,554s (1972).

Yale et al., J. Heterocyclic Chemistry, Vol. 10, No. 2, pp. 123–125 (Feb., 1973).

*Primary Examiner*—Richard J. Gallagher
*Assistant Examiner*—Diana G. Rivers
*Attorney, Agent, or Firm*—Lawrence S. Levinson; Merle J. Smith; Donald J. Barrack

[57] ABSTRACT

6,7,8,9-Tetrahydro-2-aryl-9-alkyl-4H-pyrido[1,2-a]-pyrimidin-4-ones, processes for their preparation, and methods for their use are disclosed herein.

5 Claims, No Drawings

6,7,8,9-TETRAHYDRO-PYRIDO(1,2-A)PYRIMIDIN-4-ONES

BACKGROUND OF THE INVENTION

Pyrido[1,2-a]pyrimidines (also known as homopyrimidazoles) are well known in the heterocyclic chemistry art. U.S. Pat. No. 3,585,198, issued June 15, 1971, describes much of the literature relating to this type of compound. Additionally, the patent contains a broad sweeping disclosure of 4H-pyrido[1,2-a]pyrimidines having numerous possible substituents at every possible position on the heterocyclic ring system. This disclosure encompasses not only 4H-pyrido[1,2-a]pyrimidines per se, but also the 6,7,8,9-tetrahydro and 1,2,3,4,6,7,8,9-octahydro derivatives.

It has now been suprisingly found that certain pyrido[1,2-a]pyrimidines, i.e., 6,7,8,9-tetrahydro derivatives of pyrido[1,2-a]pyrimidines having a phenyl (or substituted phenyl) group in the 2-position, a keto group in the 4-position and an alkyl group in the 9-position, possess useful central nervous system depressant activity. The analagous pyrido[1,2-a]pyrimidines that are unsaturated in the 6,7- and 8,9-positions, and those in which both rings are saturated, are devoid of this type of activity.

SUMMARY OF THE INVENTION

Compounds having the structure

I 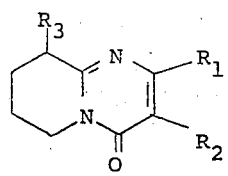

have useful pharmacological activity. In formula I, and throughout the specification, the symbols have the following meanings.

$R_1$ can be phenyl or phenyl having one or two substituents selected from alkyl, alkoxy, halogen, and trifluoromethyl;

$R_2$ can be hydrogen or alkyl; and $R_3$ can be alkyl.

The term "alkyl" as used throughout the specification refers to a straight or branched chain saturated hydrocarbon group having 1 to 6 carbon atoms. Exemplary alkyl groups are methyl, ethyl, propyl, isopropyl, butyl, t-butyl, isobutyl, hexyl, etc. Alkyl groups having 1 to 3 carbon atoms are preferred.

The term "alkoxy" as used throughout the specification refers to groups having the formula Y-O-, wherein Y is alkyl as defined above. Alkoxy groups having 1 to 3 carbon atoms are preferred.

The term "halogen" as used throughout the specification refers to fluorine, chlorine, bromine and iodine; chlorine and bromine are the preferred halogens.

DETAILED DESCRIPTION OF THE INVENTION

The compounds of formula I can be prepared from aroylacetates having the structure:

II 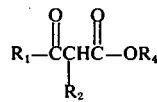

In formula II, and throughout the specification, the symbol $R_4$ represents alkyl groups having 1 to 3 carbon atoms. Reaction of an aroylacetate of formula II with an aminopyridine having the structure:

III 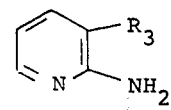

yields the corresponding 2-aryl-9-alkyl-4H-pyrido[1,2-a]pyrimidin-4-one having the structure:

IV 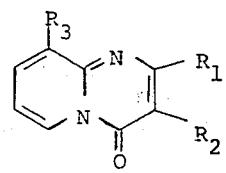

The reaction is novel, and as such, it constitutes a part of this invention. The novel reaction is run in a hydroxyalkyl ether solvent, e.g., ethylene glycol monomethyl ether or ethylene glycol monoethyl ether under reflux conditions for 1 day to 10 days, preferably 2 days to 5 days. It is a critical feature of this reaction that p-toluenesulfonic acid be added to the reaction mixture in an amount of from about 0.2 mole to 0.5 mole per mole of aminopyridine; the use of about 0.25 mole of p-toluenesulfonic acid per mole of aminopyridine is preferred.

Alternatively, the intermediates of formula IV wherein $R_2$ is hydrogen can be prepared by reacting an aminopyridine of formula III with an aminocinnamate having the structure:

V 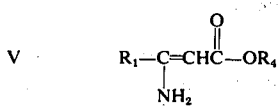

The reaction can be run in an aromatic solvent, e.g., xylene or diethylbenzene, at elevated temperatures, preferably 130°C to 190°C. Depending of course on the particular reactants and the temperature of the reaction, the reaction will take from 1 day to 4 days. This procedure is not applicable when $R_1$ is phenyl substituted with iodine.

Catalytic reduction of the pyrido[1,2-a]pyrimidin-4-ones of formula IV to the corresponding 6,7,8,9-tetrahydro derivatives is accomplished using procedures well known in the art. The preferred catalyst is Raney nickel; the use of a platinum or palladium oxide catalyst yields the octahydro derivatives of the compounds of formula IV rather than the desired tetrahydro derivatives.

The 2-amino-3-alkylpyridine starting materials of formula III are well known in the art; see for example, L. E. Tennenbaum, "Alkylpyridines," Vol. 14, Pt. 2, of "The Chemistry of Heterocyclic Compounds," Interscience, 1961, pp. 155–298; R. G. Micetich, Vol. 14, Pt. 2 of "The Chemistry of Heterocyclic Compounds," Interscience, 1974, pp. 263–406. The 2-amino-3-alkylpyridines are prepared by the well known Chichibabin reaction of the 3-alkylpyridines with sodium amide.

The aroylacetates of formula II are known, and can be readily prepared by reacting an acid chloride having the structure:

with an ester having the structure:

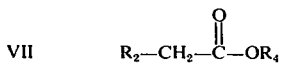

In the presence of a sodium alkoxide (e.g., sodium methoxide); see for example, Organic Reactions, Vol. 1, Chapter by C. R. Hauser and B. E. Hudson, Jr., p. 266.

The 3-aminocinnamates of formula V are known, and can be readily prepared by reacting a Grignard reagent of the structure:

VIII  $R_1$-Mg-X wherein X is chlorine or bromine, with a 1-cyanoacetate having the structure:

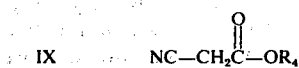

The novel 6,7,8,9-tetrahydro-2-aryl-9-alkyl-4H-pyrido[1,2-a]pyrimidin-4-ones of this invention can be converted, using procedures well known in the art, into their pharmaceutically acceptable acid-addition salts. Illustrative of the salts contemplated for use in this invention are the hydrohalides (e.g., the hydrochloride and hydrobromide), sulfate, nitrate, tartrate, phosphate, maleate, fumarate, citrate, succinate, methanesulfonate, benzenesulfonate, toluenesulfonate, and the like.

The compounds of formula I, and the pharmaceutically acceptable acid-addition salts thereof, are useful in mammalian species such as rats, dogs, monkeys and others, as central nervous system depressants and can be used as tranquilizers for the relief of anxiety and tension states in the same manner as chlordiazepoxide.

For this purpose these compounds can be incorporated in a conventional dosage form such as tablet, capsule, injectable or the like, along with the necessary carrier material, excipient, lubricant, buffer or the like, for oral or parenteral administration in single or divided doses of about 1 to 100 mg./kg./day, preferably about 5 to 15 mg./kg., two to four times daily.

EXAMPLE 1

A.  6,7,8,9-Tetrahydro-9-methyl-2-phenyl-4H-pyrido[1,2-a]pyrimidin-4-one  9-Methyl-2-phenyl-4H-pyrido[1,2-a]pyrimidin-4-one

METHOD 1

A mixture of 9.6 of ethyl 3-aminocinnamate, 5.4 g of 2-amino-3-methylpyridine, and 50 ml of diethylbenzene is heated in an oil bath at 165°–175°C for about 21 hours. No solid separates on cooling the reaction mixture. The volatiles are removed in vacuo. and the residue is cooled to give 1.79 g of solid, melting point 164°–171°C. Recrystallization from ethyl acetate gives 1.2 g of the title compound, melting point 180°–182°C.

METHOD 2

A solution of 10.8 g of 2-amino-3-methylpyridine, 38.4 g of ethyl benzoylacetate, 5.0 g of p-toluenesulfonic acid, and 100 ml of ethyleneglycol monomethyl ether is heated under reflux for nine days, and then cooled. The crystalline solid that separates is filtered and air-dried to give 5.7 g of material, melting point 178°–182°C. Recrystallization from ethyl acetate gives 3.82 g of the title compound, melting point 182°–183°C.

B.  6,7,8,9-Tetrahydro-9-methyl-2-phenyl-4H-pyrido[1,2-a]pyrimidin-4-one

A suspension of 3.4 g of 9-methyl-2-phenyl-4H-pyrido[1,2-a]pyrimidin-4-one, 4 g of Raney nickel, and 200 ml of absolute ethanol is hydrogenated [50 psi/25°C] to give 3.4 g of product, melting point 68°–75°C. Recrystallization from pentane yields 2.5 g of the title compound, melting point 78°–80°C.

EXAMPLES 2 – 8

Following the procedure of Example 1, parts A & B (utilizing Method 1 in part A), but substituting the compound listed in column I below for ethyl 3-aminocinnamate, and the compound listed in column II below for 2-amino-3-methylpyridine, the compound listed in column III is obtained.

| Example | Column I | Column II | Column III |
|---|---|---|---|
| 2 | 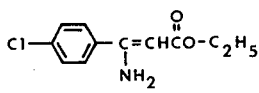 | 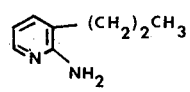 | 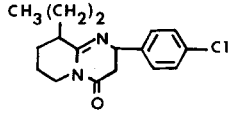 |
| 3 | 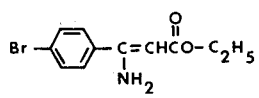 | 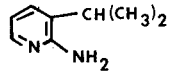 | 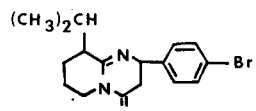 |
| 4 | 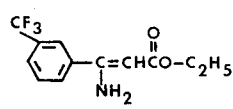 | 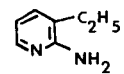 | 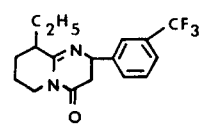 |

Continued
| Example | Column I | Column II | Column III |
|---|---|---|---|
| 5 | 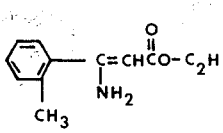 | 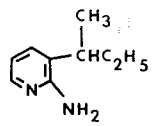 | 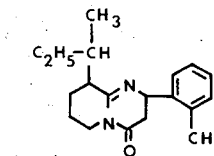 |
| 6 | 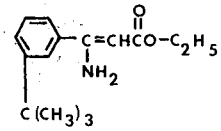 | 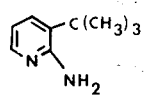 | 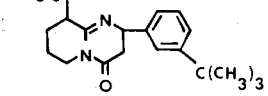 |
| 7 | 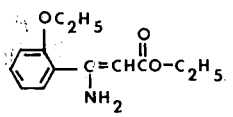 | 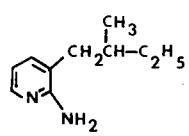 | 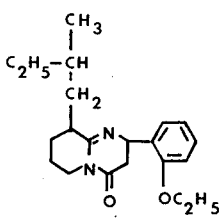 |
| 8 | 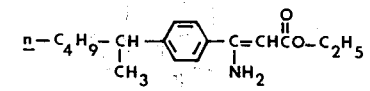 | 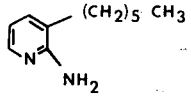 | 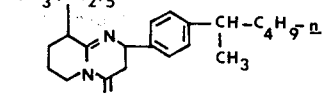 |
EXAMPLES 9 – 26
Following the procedure of Example 1, parts A & B, (utilizing Method 2 in part A), but substituting the compound listed in column I below for ethyl benzoylacetate and the compound listed in column II below for 2-amino-3-methylpyridine, the compound listed in column III is obtained.
| Example | Column I | Column II | Column III |
|---|---|---|---|
| 9 | 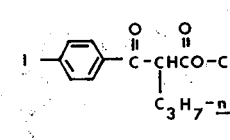 | 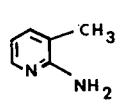 | 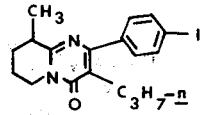 |
| 10 | 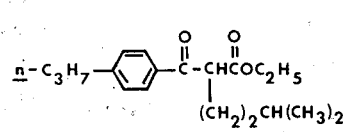 | 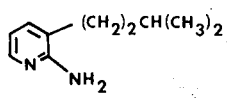 | 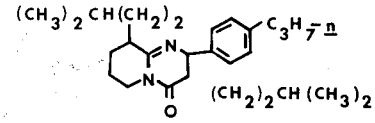 |
| 11 | 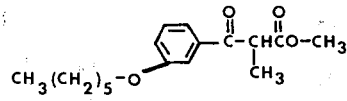 | 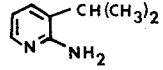 | 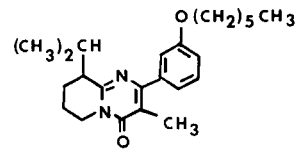 |
| 12 | 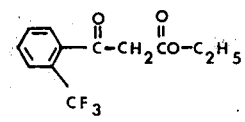 | 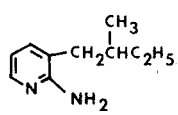 | 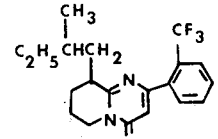 |

| Example | Column I | Column II | Column III |
|---|---|---|---|
| 13 | 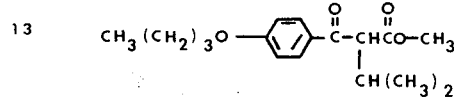 | 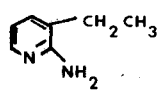 | 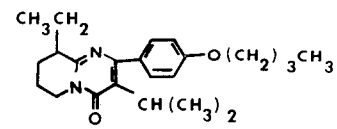 |
| 14 | 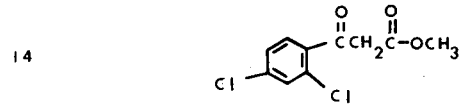 | 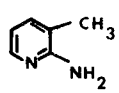 | 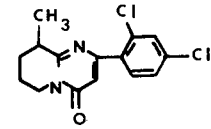 |
| 15 | 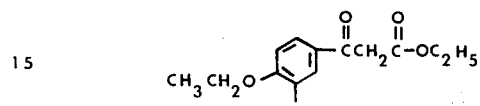 | 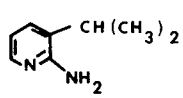 | 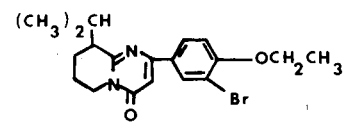 |
| 16 | 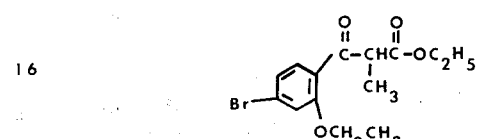 | 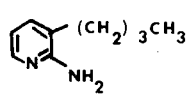 | 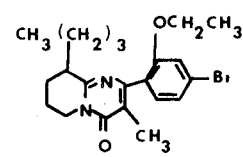 |
| 17 | 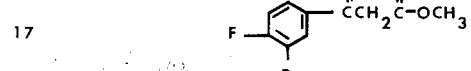 | 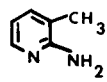 | 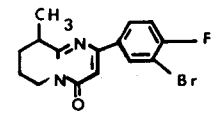 |
| 18 | 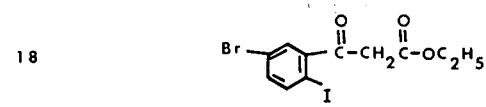 | 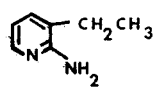 | 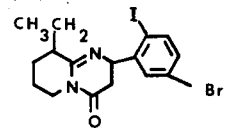 |
| 19 | 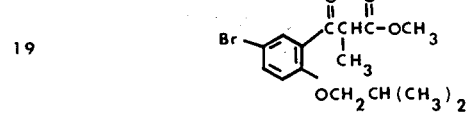 | 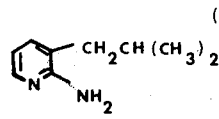 | 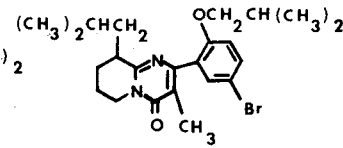 |
| 20 | 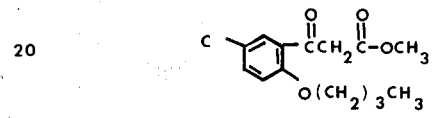 | 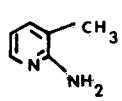 | 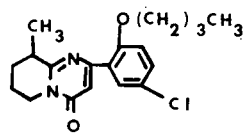 |
| 21 | 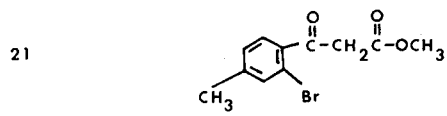 | 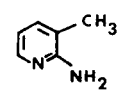 | 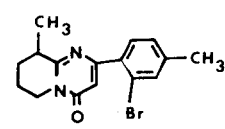 |
| 22 | 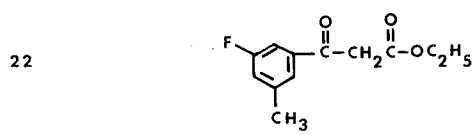 | 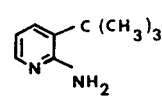 | 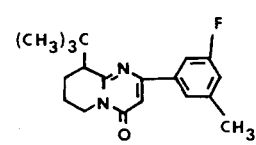 |

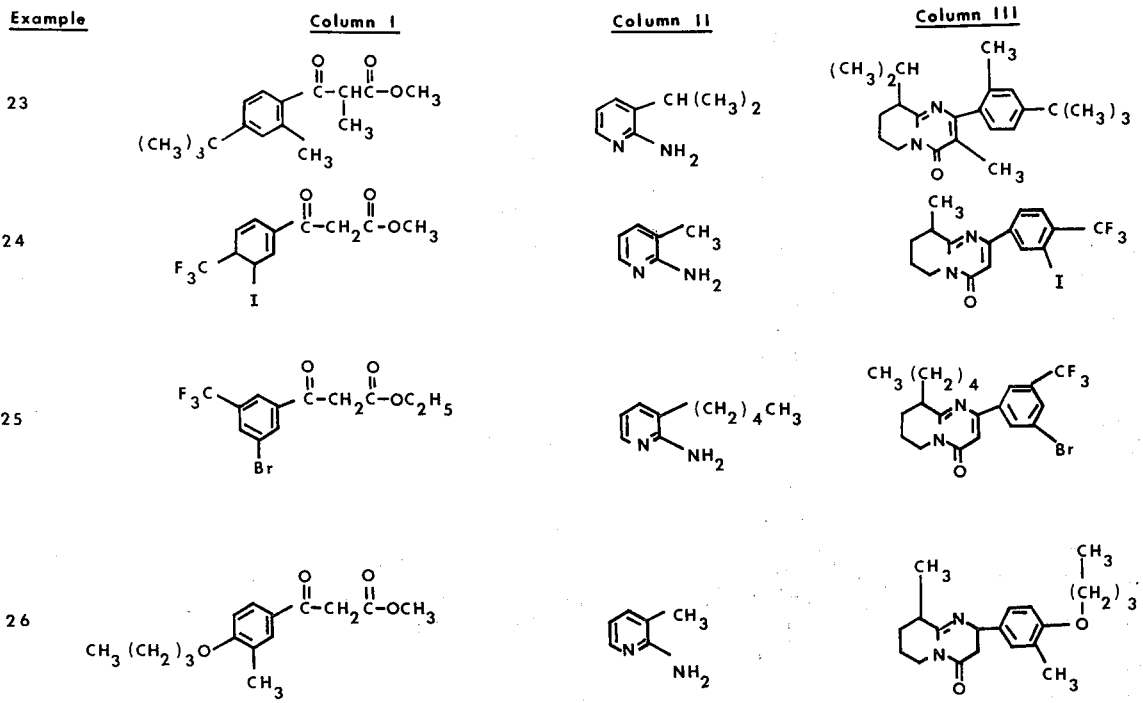

EXAMPLE 27

6,7,8,9-Tetrahydro-9-methyl-2-phenyl-4H-pyrido-[1,2-a]pyrimidin-4-one, salt with p-toluenesulfonic acid, dihydrate To a stirred solution of 2.40 g of 6,7,8,9-tetrahydro-9-methyl-2-phenyl-4H-pyrido[1,2-a]pyrimidin-4-one (prepared as described in Example 1) in 25 ml of warm water is added a solution of 1.90 g of p-toluenesulfonic acid monohydrate in 25 ml of warm water. The solution that forms is clarified by filtration, cooled, frozen, and lyophilized to give 4.20 g of the title compound as a free-flowing solid.

EXAMPLE 28

9-Ethyl-6,7,8,9-tetrahydro-2-($\alpha,\alpha,\alpha$-trifluoro-m-tolyl)-4H-pyrido[1,2-a]pyrimidin-4-one, salt with maleic acid To a stirred solution of 3.22 g of 9-ethyl-6,7,8,9-tetrahydro-2-($\alpha,\alpha,\alpha$-trifluoro-m-tolyl)-4H-pyrido[1,2-a]-pyrimidin-4-one (prepared as described in Example 4) in 25 ml of acetonitrile is added a warm solution of 1.16 g of maleic acid in 15 ml of acetonitrile. The mixture is stirred as it cools to room temperature. The solution is then filtered and cooled to give the title compound.

EXAMPLE 29

2-[m-(n-Hexyloxy)phenyl]-3-methyl-9-(2-propyl)-6,7,8,9-tetrahydro-4H-pyrido[1,2-a]pyrimidin-4-one, hydrochloride To a solution of 3.62 g of 2-[m-(n-hexyloxy)phenyl]-3-methyl-9-(2-propyl)-6,7,8,9-tetrahydro-4H-pyrido[1,2-a]-pyrimidin-4-one (prepared as described in Example 11) in 50 ml of anhydrous ether, at 0°C, is added, dropwise, 10 ml of N ethereal hydrogen chloride; a precipitate forms during the addition. Subsequently, the mixture is stirred for 15 minutes at 0°C, and filtered rapidly to give the title compound.

What is claimed is:

1. A compound having the structure

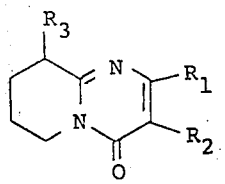

or a pharmaceutically acceptable salt thereof, wherein $R_1$ is phenyl or phenyl substituted with alkyl, alkoxy, halogen or trifluoromethyl in one or two positions; $R_2$ is hydrogen or alkyl; and $R_3$ is alkyl; wherein alkyl and alkoxy are groups having 1 to 3 carbon atoms.

2. A compound in accordance with claim 1 wherein $R_1$ is phenyl.

3. A compound in accordance with claim 1 wherein $R_2$ is hydrogen.

4. A compound in accordance with claim 1 wherein $R_2$ is alkyl.

5. The compound in accordance with claim 1 having the name 6,7,8,9-tetrahydro-9-methyl-2-phenyl-4H-pyrido[1,2-a]pyrimidin-4-one.

* * * * *